(12) United States Patent
Arden et al.

(10) Patent No.: US 6,726,742 B2
(45) Date of Patent: Apr. 27, 2004

(54) AIR CLEANER WITH A SECONDARY INTAKE

(75) Inventors: Nick P. Arden, Essex (GB); John R. Marsh, Essex (GB); Neil McGregor, Essex (GB); Wayne E. A. Johnson, Essex (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 91 days.

(21) Appl. No.: 09/927,838

(22) Filed: Aug. 10, 2001

(65) Prior Publication Data
US 2003/0029143 A1 Feb. 13, 2003

(51) Int. Cl.⁷ .................. B01D 51/00; B01D 46/46; F02M 23/04; F02M 35/10; F02M 35/12
(52) U.S. Cl. .................. 95/1; 95/273; 96/397; 96/417; 96/380; 96/384; 55/385.3; 55/419; 55/420; 55/DIG. 28; 123/198 E; 123/585; 123/586; 123/587; 137/480
(58) Field of Search .................. 55/312, 313, 385.3, 55/419, DIG. 28, 420; 95/1, 22, 273; 123/198 E, 585, 586, 587, 699, 700; 137/480; 96/397, 417, 380, 384

(56) References Cited

U.S. PATENT DOCUMENTS

| | | | | |
|---|---|---|---|---|
| 2,788,086 A | * | 4/1957 | Sebok | 55/419 |
| 3,452,521 A | * | 7/1969 | Remacle | 55/419 |
| 3,513,817 A | * | 5/1970 | Kearsley | 55/419 |
| 3,704,698 A | | 12/1972 | Sarto et al. | 123/119 B |
| 3,877,908 A | * | 4/1975 | Phelps | 55/419 |
| 4,013,137 A | | 3/1977 | Petersen | |
| 4,197,101 A | * | 4/1980 | Cote et al. | 55/419 |
| 4,261,717 A | * | 4/1981 | Belore et al. | 55/419 |
| 4,489,640 A | | 12/1984 | Olson | |
| 4,705,011 A | | 11/1987 | Hibino et al. | |
| 4,715,349 A | | 12/1987 | Hibino et al. | |
| 4,732,132 A | | 3/1988 | Kobayashi et al. | |
| 4,763,265 A | | 8/1988 | Kawanabe et al. | |
| 4,969,939 A | * | 11/1990 | Machado | 55/419 |
| 5,195,484 A | * | 3/1993 | Knapp | 123/198 E |
| 5,368,620 A | * | 11/1994 | Chiba et al. | 55/385.3 |
| 5,400,753 A | * | 3/1995 | Andress et al. | 55/385.3 |
| 5,454,859 A | * | 10/1995 | Chiba et al. | 55/385.3 |
| 5,501,716 A | * | 3/1996 | Chiba et al. | 55/385.3 |
| 5,819,696 A | * | 10/1998 | Wada | 55/419 |
| 6,164,631 A | * | 12/2000 | Seliminsky | 261/44.4 |
| 6,209,503 B1 | * | 4/2001 | Komada et al. | 123/184.56 |
| 6,395,048 B1 | * | 5/2002 | Yoder et al. | 55/385.3 |
| 6,425,930 B1 | * | 7/2002 | Wake et al. | 55/385.3 |

FOREIGN PATENT DOCUMENTS

| | | | |
|---|---|---|---|
| DE | 41 33 815 A1 | * 4/1993 | F02B/27/00 |
| DE | 198 11 051 A1 | 9/1999 | |
| DE | 4133815 | 10/2003 | |
| JP | 05321674 | 7/1993 | |

OTHER PUBLICATIONS

European Search Report issued on Aug. 28, 2003 for European application No. 02252494.6, pp. 1–4.

* cited by examiner

Primary Examiner—Duane Smith
Assistant Examiner—Jason M. Greene
(74) Attorney, Agent, or Firm—Brinks Hofer Gilson & Lione

(57) ABSTRACT

An air cleaner intake door is provided. An air cleaner with at least one sidewall and an opening defined in the sidewall has a door mounted over the opening. The door is rotationally movable between an open and a closed position and a cam extends from the door. A spring is in contact with the door for biasing the door towards a closed position.

18 Claims, 7 Drawing Sheets

AIR CLEANER WITH A SECONDARY INTAKE

FIELD OF THE INVENTION

The invention relates generally to the field of air cleaners. In particular, this invention relates to an air cleaner with a secondary intake for automotive vehicles.

DESCRIPTION OF THE RELATED ART

Combustion engines require a regular supply of air in order to operate. An engine can generate increased power as long as the supply of air can be increased. Air is supplied to the engine via air intakes.

In a standard air intake, a filter is typically used to screen out any debris that could enter the engine and cause damage to it. An air cleaner normally has one intake for dirty air, through which outside air enters. The outside air is drawn through an enclosed passage through a filter and into the engine, where it is mixed with fuel in the engine induction system. If the opening or passage of an air cleaner becomes blocked, the air supply to the engine will be cut off or greatly reduced, resulting in stalling or decreased engine power. Leaves or other roadside debris often cause such blockage. The air intake could also become blocked or otherwise cut off by being immersed in water if a car passes through deep standing water.

It is desirable to increase the air intake to provide more air to increase engine output. It is also desirable to provide a secondary air intake with the capability to open and close in situations where the primary air intake becomes clogged or blocked. It is preferred, however, to keep engine noise to a minimum level in order to avoid breaching noise regulations. If an air intake is increased in size to improve engine power, engine noise will likewise increase. Larger or more numerous air intakes make it more difficult to keep engine noise below the threshold levels without expensive modifications.

BRIEF SUMMARY OF THE INVENTION

In one embodiment of the present invention, an air cleaner with a secondary intake is provided. An air cleaner with at least one sidewall and an opening defined in the sidewall has a door mounted over the opening. The door is rotationally movable between an open and a closed position and a cam extends from the door. A spring is in contact with the door for biasing the door towards a closed position.

In a second embodiment of the present invention, an air cleaner intake with a secondary is provided. An air cleaner with at least one sidewall and an opening in the sidewall is provided. A door is mounted over the opening in the sidewall and a cam extends from the door. A solenoid assembly with a movable shaft is attached to the sidewall so as to allow the movable shaft to move into contact with the cam.

The invention may also be embodied in a method for supplying a secondary air intake on an air cleaner. The method includes the steps of providing a door with an attached cam mounted on the air cleaner by an axle and providing a solenoid assembly with a movable shaft. The solenoid assembly is activated by a signal from the engine control system and the movable shaft moves through the activation of the solenoid assembly. The movable shaft contacts the cam and opens the door.

DETAILED DESCRIPTION OF THE PREFERRED EMBODIMENTS OF THE INVENTION

Figure 1:
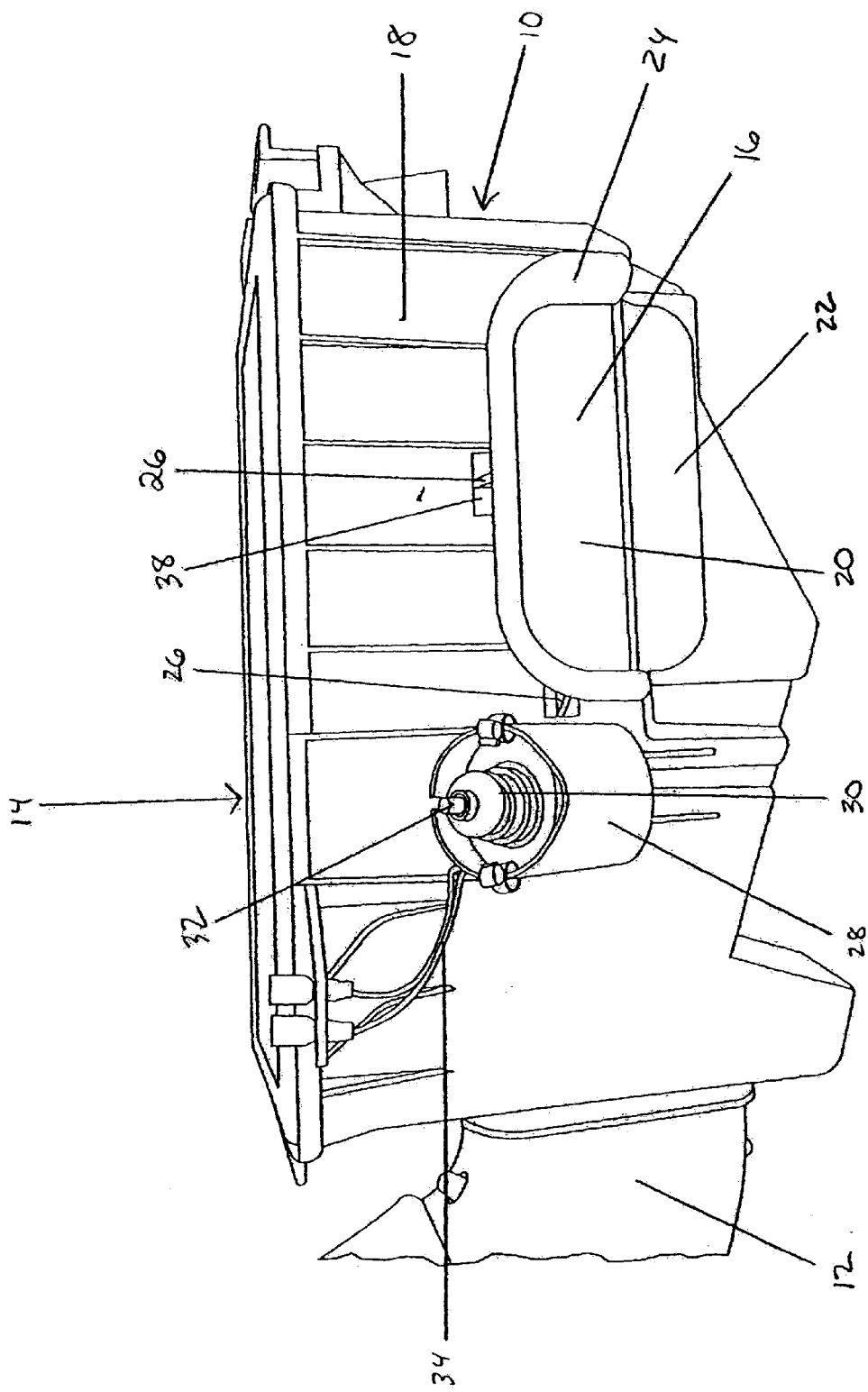
FIG. 1 is a side view of the exterior of an air cleaner with a secondary intake of the present invention.
Figure 2:
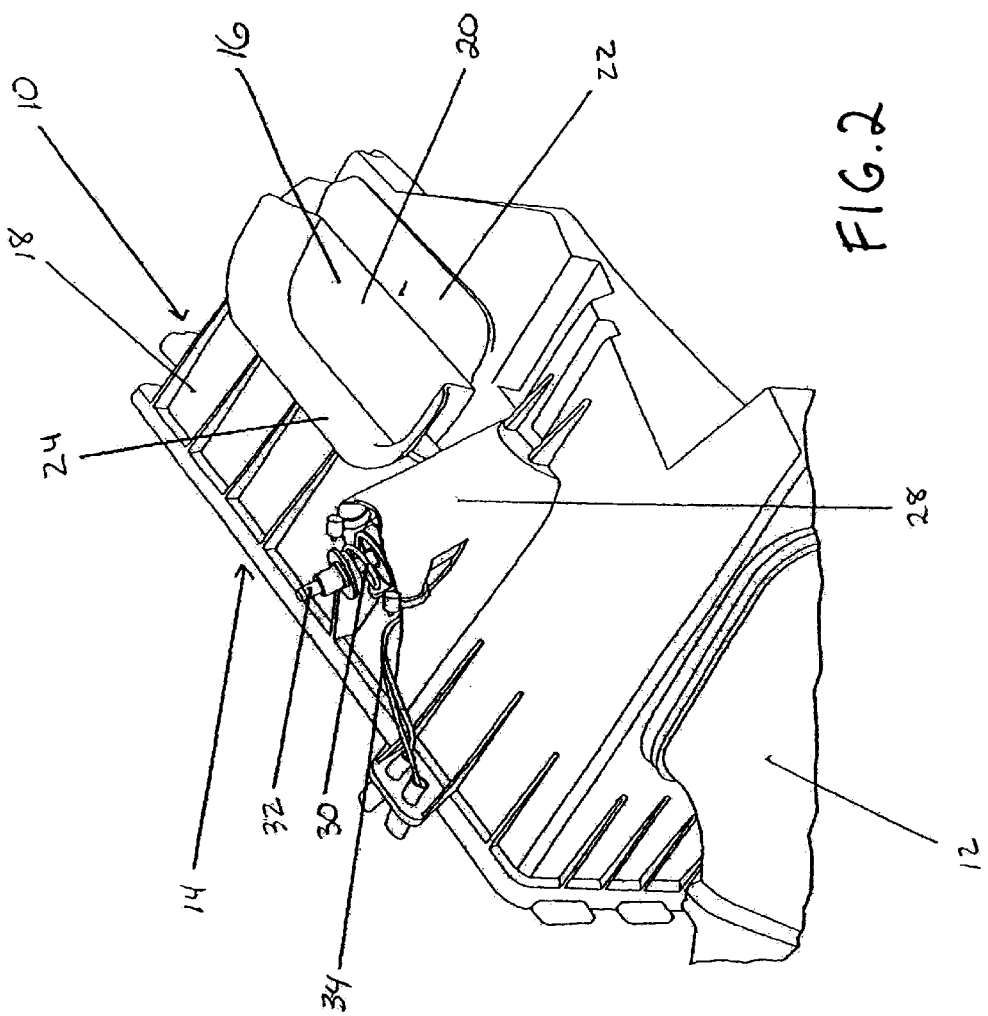
FIG. 2 is a perspective view of the exterior of the air cleaner with a secondary intake of FIG. 1.
Figure 3:
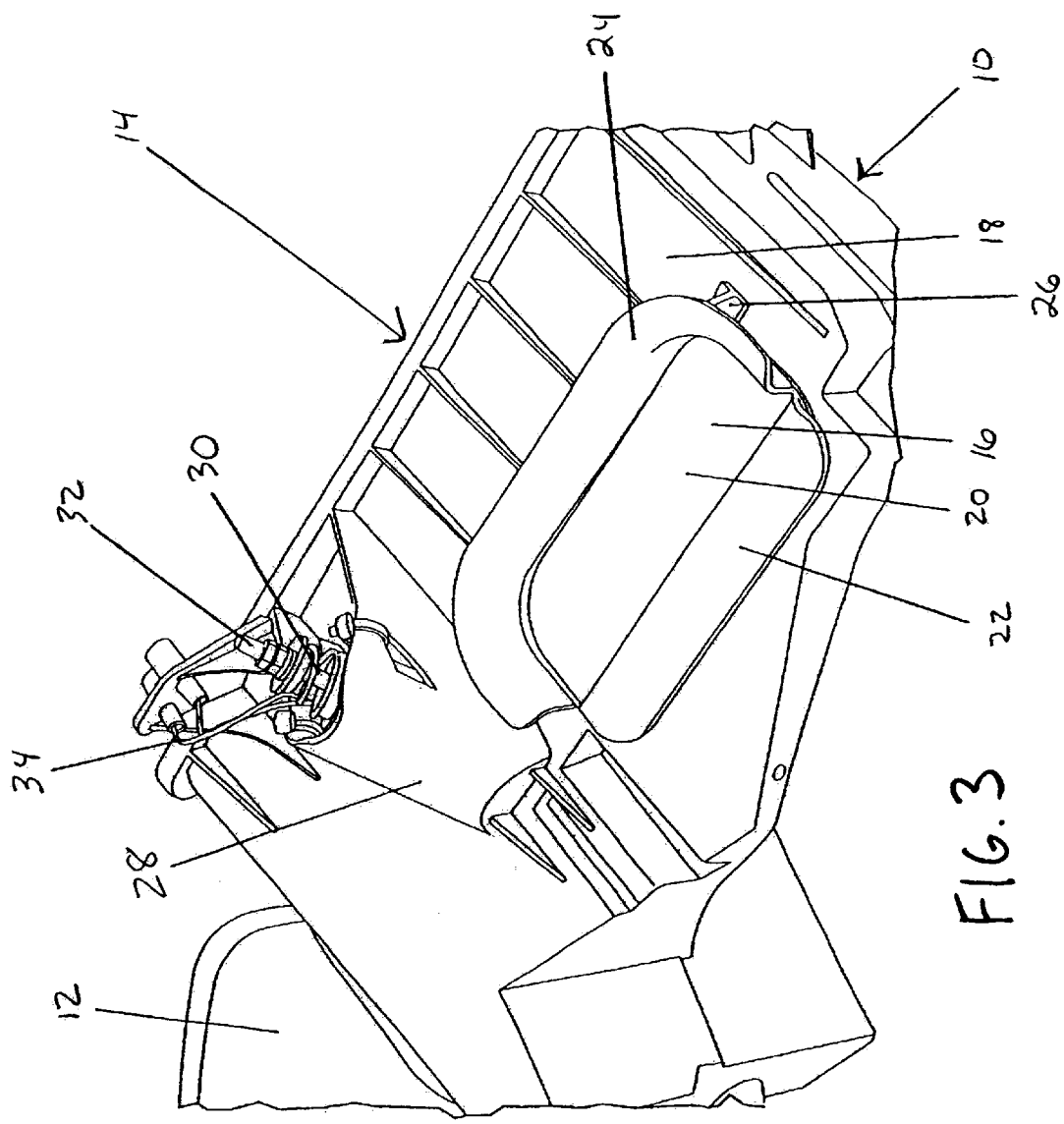
FIG. 3 is a perspective view of the exterior of the air cleaner with a secondary intake of FIG. 1.

Referring in combination to FIGS. 1–3, an air cleaner 10 having a secondary air intake of the present invention is shown. The air cleaner 10 has a primary air intake 12 on one side thereof. Air flows through the primary air intake 12, into the air cleaner 10, and continues through a filter (not shown) on the top side 14 of the air cleaner 10 to the engine where it mixes with fuel.

Figure 7:
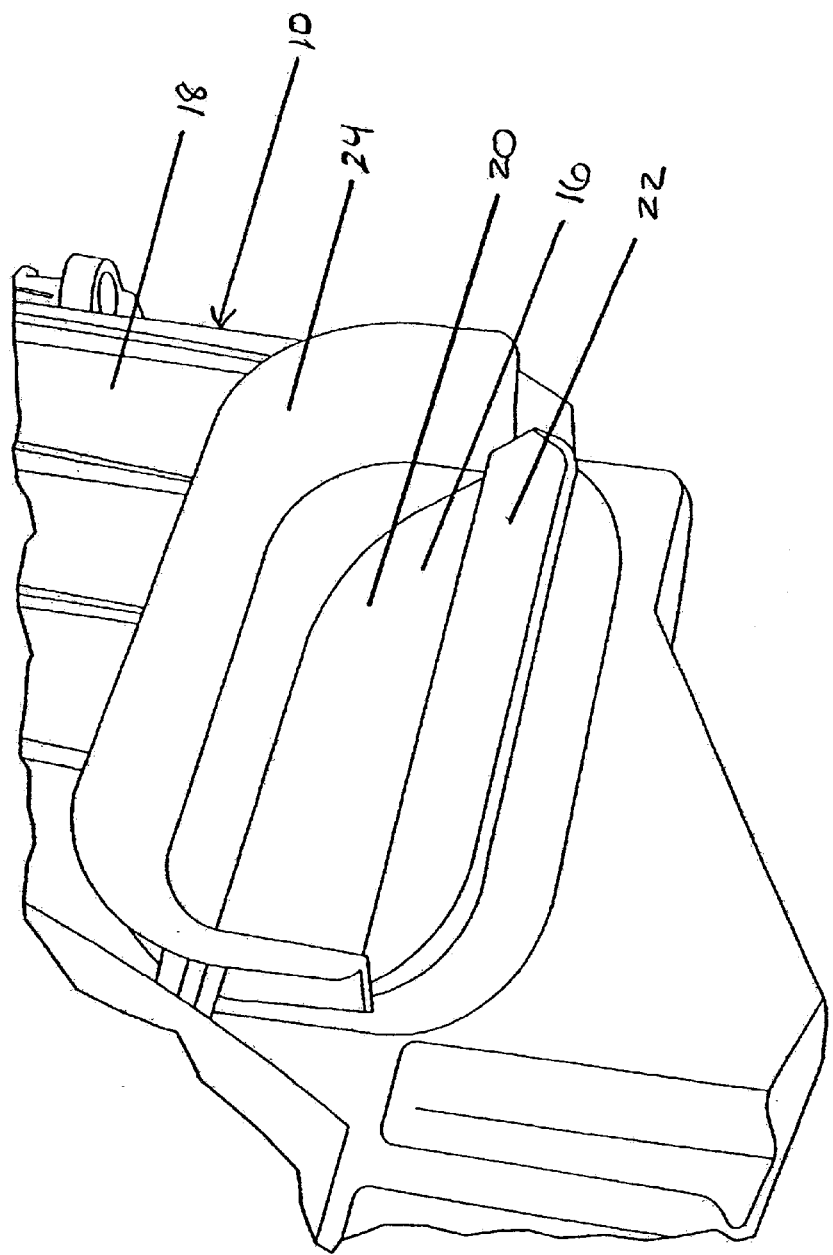
FIG. 7 is an exterior close-up of the air cleaner with a secondary intake of FIG. 1 showing the door in an open position.

A door 16 is preferably provided on a sidewall 18 of the air cleaner 10 to provide a secondary air intake. An opening in the sidewall 18 forms the secondary air intake. In FIGS. 1–3, the door 16 is shown from its first side 20. The door 16 is positioned over the opening in the sidewall 18. The door 16 preferably includes a flap 22 that contacts the sidewall 18 of the air cleaner 10 when the door 16 is in its closed position as shown in FIGS. 1–3. The contact between the flap 22 and the sidewall 18 of the air cleaner 10 prevents the door 16 from rotating outwardly from the air cleaner 10. FIG. 7 shows the door 16 in an open position and the flap 22 out of contact with the sidewall 18 of the air cleaner 10. A curved bellmouth 24 extends from the sidewall 18 of the air cleaner 10. The bellmouth 24 increases the amount of air that may enter the intake, thus increasing efficiency. The bellmouth 24 may be attached to the sidewall 18 of the air cleaner 10 via a plurality of clips 26, allowing for easy removal if necessary.

A housing 28 is preferably positioned on the sidewall 18 of the air cleaner 10 to hold a solenoid assembly 30. The solenoid assembly 30 is operatively connected to an actuated shaft 32, which is movable in response to the activation of the solenoid assembly 30. The solenoid assembly 30 is preferably connected to a circuit via wires 34 running to a control system that can activate the solenoid assembly 30 depending on the requirements of the engine.

Figure 4:
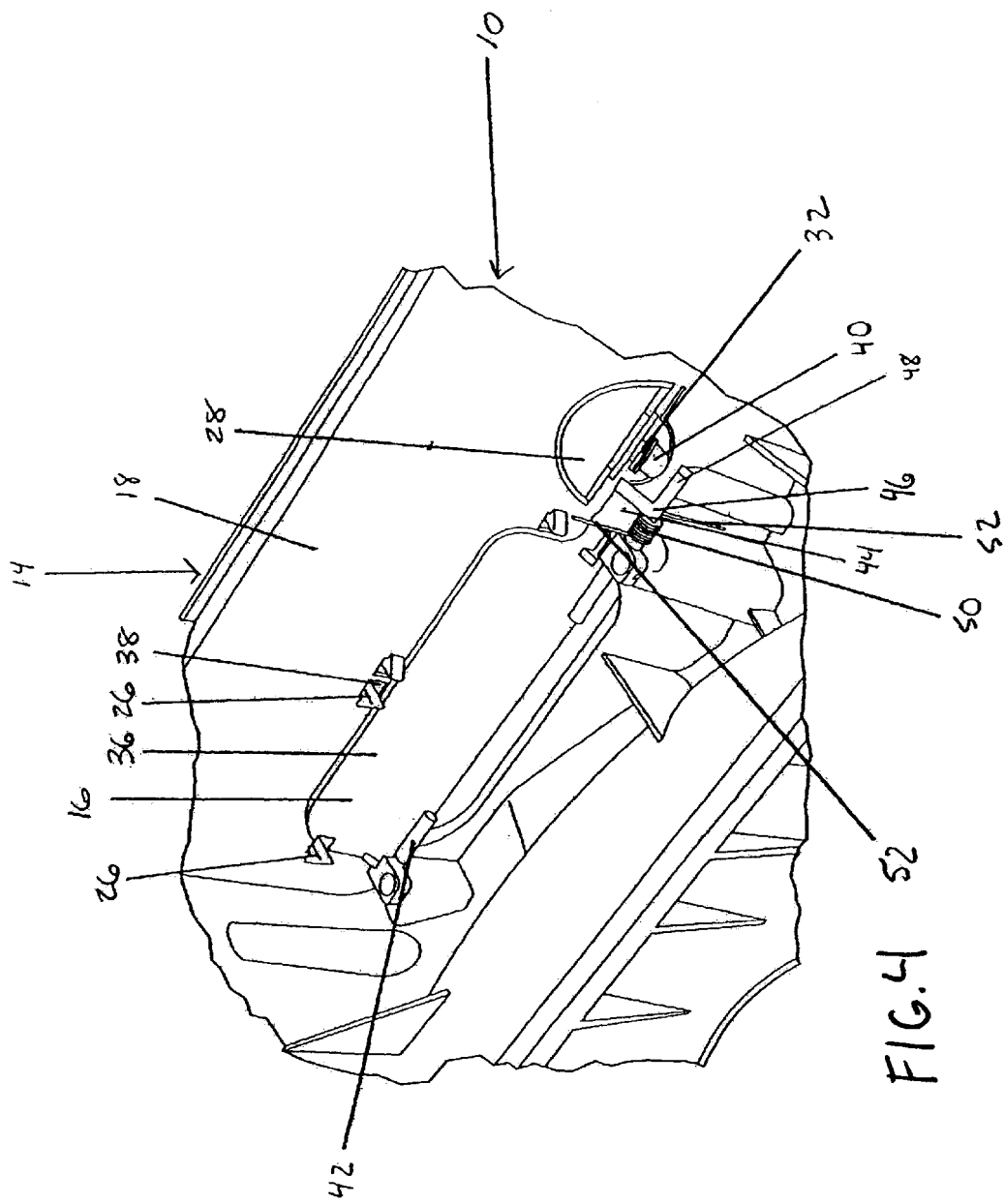
FIG. 4 is a perspective view of the interior of the air cleaner with a secondary intake of FIG. 1.

Referring to FIG. 4, the second side 36 of the door 16 is shown from the interior of the air cleaner 10. The bellmouth 24 could be attached to the air cleaner 10 in any number of ways. One example would be to provide clips 26 to hold the bellmouth 24 in place. The clips 26 protrude into the interior of the air cleaner 10 through holes 38 defined in the sidewall 18 of the air cleaner 10. The bellmouth 24 could also be welded in place or attached with an adhesive. The housing 28 for the solenoid assembly 30 also protrudes into the interior of the air cleaner 10. The tip 40 of the actuated shaft 32 of the solenoid assembly 30 is shown in FIG. 4 in its first position.

Figure 5:
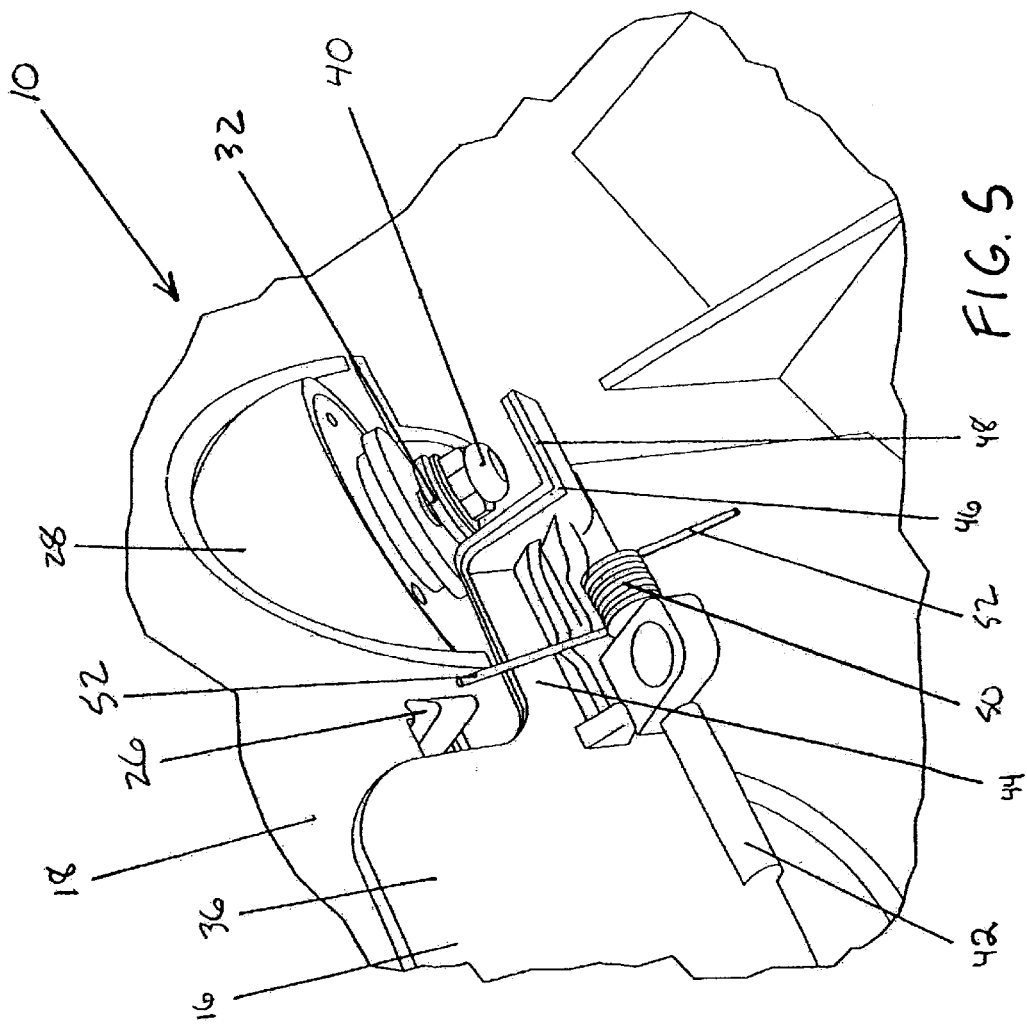
FIG. 5 is a close-up view of the interior of the air cleaner with a secondary intake of FIG. 1 showing the cam and the solenoid actuated shaft.
Figure 6:
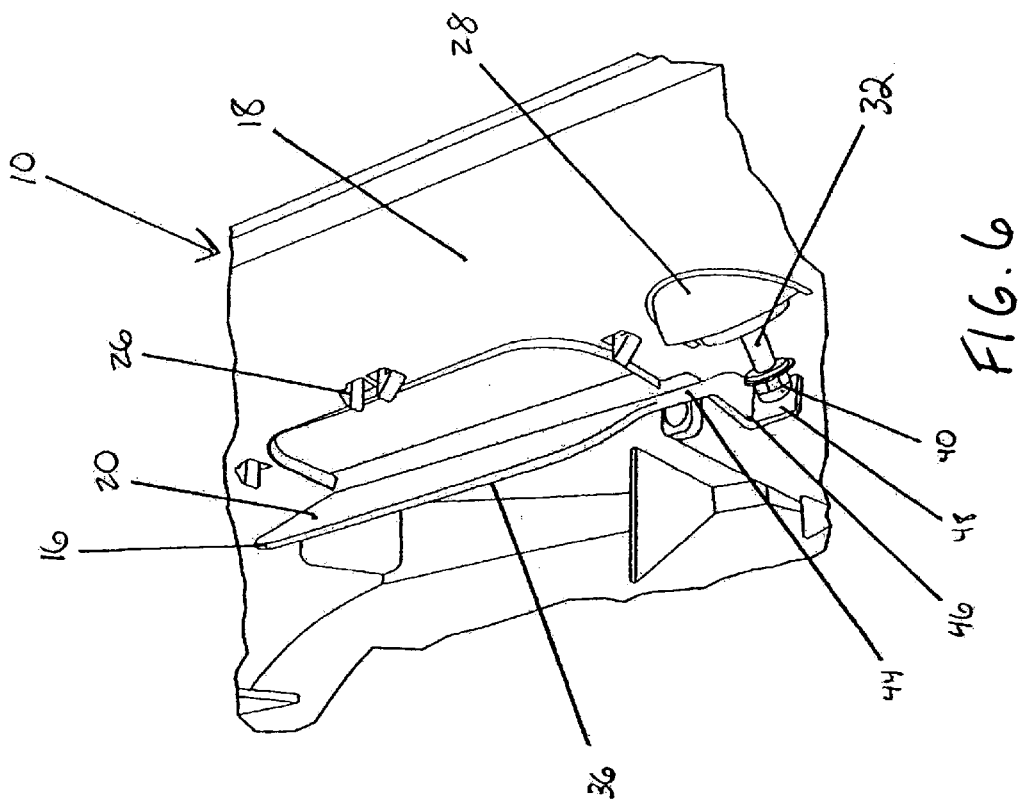
FIG. 6 is an interior view of the air cleaner with a secondary intake of FIG. 1 showing the door in an open position.

Referring to FIGS. 4–6 in combination, the door 16 is preferably rotationally connected to the air cleaner 10 by an axle 42. The axle 42 allows the door 16 to pivot from an open to a closed position. As shown more clearly in FIG. 5, a cam extension 44 preferably extends from one side of the door 16. The cam extension 44 is preferably located on the interior of the air cleaner 10 and is shown in the figures as being continuous with the door 16. The cam extension 44 preferably extends parallel to the sidewall 18 of the air cleaner 10. The cam extension 44 preferably has a bent section 46 forming a ledge 48 that is substantially aligned with the actuated shaft 32 of the solenoid assembly 30. The cam extension 44 is preferably not physically connected to the actuated shaft 32. A coiled spring 50 has a main body preferably wrapped around the axle 42 and preferably has two extensions 52 to provide opposing biasing force. One extension 52 is in contact with the sidewall 18 of the air cleaner 10, and the other extension 52 is in contact with the cam extension 44. The extensions 52 provide rotational resistance to the cam extension 44, preventing the door 16 from opening without sufficient force. The spring 50 also acts to return the door 16 to a closed position. Other embodiments of the spring 50 could be utilized to provide the appropriate biasing force.

The operation of the door 16 is as follows. There are preferably two methods of opening the door 16 in the invention provided. The first method acts as a fail-safe mechanism to allow the door 16 to open when the primary air intake 12 is blocked. To open the door 16 in this manner, it is not necessary to provide the structures of the solenoid assembly 30, the actuated shaft 32, or the cam extension 44. In a situation where the primary air intake 12 is blocked by debris or water, the vacuum pressure on the inside of the air cleaner 10 will increase due to the suction of the engine intake manifold. The spring 50 and the extensions 52 on the axle 42 of the door 16 are preferably calibrated to withstand a certain amount of pull from vacuum pressure in the manifold. A typical vacuum level that would cause the door 16 to open would be 1 kPa or an opening force of 50N. Of course, other levels than those specified may be utilized without departing from the present invention. A blockage increases the vacuum pressure past the threshold of resistance and the door 16 is pulled inwardly by the vacuum pressure, allowing air to enter the air cleaner 10 through the secondary intake. This prevents engine stalling and maintains engine power when the primary intake 12 is blocked. This method also functions when the solenoid assembly 30 and the actuated shaft 32 are present, since the actuated shaft 32 is not physically connected to the cam extension 44.

An alternate method of opening the door 16 is also provided utilizing the solenoid assembly 30, the actuated shaft 32, and the cam extension 44. As noted previously, the solenoid assembly 30 is controlled by a circuit connected to an engine control system (not shown). The connection in the Figures is shown as a pair of wires 34, but the connection could be accomplished in any manner known in the art. The actuated shaft 32 is normally in a first position as shown in FIG. 5 when the solenoid assembly 30 is deactivated. Upon activation of the solenoid assembly 30, the actuated shaft 32 moves to its second position as shown in FIG. 6 and protrudes further into the air cleaner 10. This movement causes the tip 40 of the actuated shaft 32 to come into contact with the ledge 48 of the cam extension 44. The tip 40 of the actuated shaft 32 may be a low friction material to reduce wear on the ledge 48 of the cam extension 44. The pressure from the actuated shaft 32 against the ledge 48 of the cam extension 44 causes the door 16 to rotate into the interior of the air cleaner 10. When the solenoid assembly 30 is deactivated, an internal spring (not shown) returns the actuated shaft 32 to its first position, and the pressure on the cam extension 44 from the spring 50 moves the door 16 back to its closed position. FIG. 5 shows the actuated shaft 32 in its first position and the door 16 in its closed position, flush against the sidewall 18 of the air cleaner 10. FIG. 6 shows the actuated shaft 32 in its second position and the door 16 in an open position. FIG. 7 shows the door 16 in an open position, as viewed from the outside of the air cleaner 10.

The solenoid assembly 30 can be activated by a signal from the engine control system whenever more air is needed in the intake. For example, the solenoid assembly 30 may be activated to open the door 16 at a certain engine RPM level. This secondary air intake provided by the door 16 allows more air to enter the engine, thereby increasing engine power and output. By only allowing the door 16 to open at certain engine RPM levels, engine noise regulations can be met without necessitating extra sound-dampening measures.

It should be noted that there could be a wide range of changes made to the present invention without departing from its scope. The door 16 could vary in size and shape, as could the cam extension 44 and ledge 48. The cam extension 44 and solenoid assembly 30 could be positioned differently. If the fail-safe mechanism allowing the door 16 to open in the event of primary air intake 12 blockage is not desired or necessary, the actuated shaft 32 could be directly connected to the door 16, which would allow the door 16 to open only when the solenoid assembly 30 is activated. The solenoid assembly 30 could also be activated by other signals from the vehicle. The bellmouth 24 may be permanently attached to the sidewall 18 of the air cleaner 10 rather than removably attached. The door 16 could be relocated on a different side of the air cleaner 10, and more than one door 16 could be used on the same air cleaner 10. Thus, it is intended that the foregoing detailed description be regarded as illustrative rather than limiting and that it be understood that it is the following claims, including all equivalents, which are intended to define the scope of the invention.

What is claimed is:

1. An air cleaner with a secondary intake door comprising:
   an air cleaner having at least one sidewall, said sidewall defining at least one opening therethrough;
   a primary air intake;
   a secondary air intake door mounted over said opening adjacent to said at least one sidewall and rotationally movable between an open position and a closed position over said opening;
   a cam extending from said door;
   a spring in contact with said cam for biasing said door towards a closed position over said opening; and
   a curved bellmouth mounted on said sidewall adjacent said opening and on the exterior of said air cleaner.

2. The air cleaner with a secondary intake door of claim 1, wherein when said door is in said closed position, said door is flush with said sidewall of said air cleaner.

3. The air cleaner with a secondary intake door of claim 2, wherein when said door is in said open position, said door extends partially into said opening.

4. The air cleaner with a secondary intake door of claim 3, wherein said cam extends from said door parallel to said sidewall.

5. The air cleaner with a secondary intake door of claim 4, wherein said spring has a main body and at least two extensions, one of which contacts said cam and one of which contacts said sidewall of said air cleaner and exerts a biasing force.

6. The air cleaner with a secondary intake door of claim 5, wherein said biasing force provided by said spring may be overcome by vacuum pressure thereby allowing said door to be opened by said vacuum pressure.

7. The air cleaner with a secondary intake door of claim 6, wherein said biasing force biases said door from its open position to its closed position.

8. The air cleaner with a secondary intake door of claim 7, further comprising a solenoid assembly attached to said sidewall and a solenoid actuated shaft extending from said solenoid assembly.

9. The air cleaner with a secondary intake door of claim 8, wherein said solenoid actuated shaft is movable between a first position and a second position.

10. The air cleaner with a secondary intake door of claim 9, wherein when said solenoid actuated shaft is in said second position, said solenoid actuated shaft contacts said cam to move said door to said open position.

11. An air cleaner with a secondary intake door comprising:
    an air cleaner having at least one sidewall with at least one opening defined therein;
    a door mounted on said sidewall and over said opening;
    a curved bellmouth mounted on said sidewall adjacent said door and on the exterior of said air cleaner;
    a cam extending from said door; and
    a solenoid assembly with a movable shaft, said solenoid assembly attached to said sidewall of said air cleaner so as to allow said movable shaft to move into contact with said cam.

12. The air cleaner with a secondary intake door of claim 11, wherein said door is movable between a closed position and an open position.

13. The air cleaner with a secondary intake door of claim 12, further comprising a spring contacting said air cleaner and said cam to bias said door towards said closed position.

14. The air cleaner with a secondary intake door intake of claim 13, wherein when said solenoid is activated, said movable shaft moves from a first position to a second position and applies pressure to said cam, moving said door to said open position.

15. The air cleaner with a secondary intake door of claim 14, wherein when said solenoid is deactivated, said shaft returns to said first position and said spring moves said door to said closed position.

16. A method for supplying a secondary air intake on an air cleaner, said method comprising:
    providing a door mounted on a sidewall with an attached cam mounted on said air cleaner intake by an axle;
    providing a curved bellmouth mounted on a sidewall adjacent said door and on the exterior of said air cleaner;
    providing a solenoid assembly with a movable shaft;
    providing an engine control system;
    activating said solenoid assembly with a signal from the engine control system;
    moving said movable shaft through the activation of said solenoid assembly; and contacting said cam with said movable shaft to open said door.

17. The method of claim 16, further comprising the step of closing said door by applying pressure to said cam from a spring attached to said axle.

18. The method of claim 17, wherein said signal activates said solenoid assembly at a certain engine RPM level.

* * * * *